United States Patent [19]

Saive et al.

[11] Patent Number: 5,039,765
[45] Date of Patent: Aug. 13, 1991

[54] PREPARATION OF ETHYLENE POLYMERS USING A ZIEGLER CATALYST SYSTEM, AND ETHYLENE POLYMERS PREPARED IN THIS MANNER AND HAVING LESS ODOR

[75] Inventors: Roland Saive, Ludwigshafen; Guido Funk, Worms; Juergen Schmidt-Thuemmes, Neuhofen; Rainer Konrad, Goennheim; Peter Bauer, Ludwigshafen, all of Fed. Rep. of Germany

[73] Assignee: BASF Aktiengesellschaft, Ludwigshafen, Fed. Rep. of Germany

[21] Appl. No.: 429,800

[22] Filed: Oct. 31, 1989

[30] Foreign Application Priority Data

Nov. 12, 1988 [DE] Fed. Rep. of Germany ....... 3838491

[51] Int. Cl.$^5$ ............................................. C08F 2/06
[52] U.S. Cl. ...................................... 526/88; 526/204; 528/490; 528/501
[58] Field of Search .................. 526/88, 204; 528/494, 528/490, 501

[56] References Cited

U.S. PATENT DOCUMENTS 4,117,219  9/1978  Kakogawa et al. ................. 528/494
4,331,791  5/2582  Rohlfing et al. .................... 528/494
4,720,552  12/1987  Bachl et al. .

Primary Examiner—Joseph L. Schofer
Assistant Examiner—Tom Weber
Attorney, Agent, or Firm—Keil & Weinkauf

[57] ABSTRACT

High density ethylene polymers are prepared by polymerizing the monomers in the presence of a Ziegler catalyst system by a process in which the resulting solid ethylene polymer is reacted in the melt with an additive capable of binding acids by esterification. The ester-forming additives are preferably epoxide compounds.

8 Claims, No Drawings

PREPARATION OF ETHYLENE POLYMERS USING A ZIEGLER CATALYST SYSTEM, AND ETHYLENE POLYMERS PREPARED IN THIS MANNER AND HAVING LESS ODOR

The present invention relates to a process for the preparation of an ethylene polymer by polymerizing the monomers in a polymerization zone at from 5 to 60 bar and at not more than 120° C. in a stirred or fluidized dry phase or in a low boiling hydrocarbon as a suspending agent in the presence of a Ziegler catalyst system, preferably consisting of a vanadium catalyst component, an organoaluminum catalyst component and an organohalogen catalyst component, isolating the resulting solid ethylene polymer from unconverted monomers and any suspending agent after reducing the pressure in a let-down zone, removing the residual amounts of monomers and any suspending agent in a devolatilization zone by passing in an inert gas stream and transferring the solid ethylene polymer to a melting zone.

Removal of unpolymerized monomers and other accompanying substances from ethylene homo- or copolymers is necessary because the monomers reduce the product quality owing to their intrinsic odor. The removal of adhering monomers, odorous substances and suspending agents or solvents from the ethylene polymers has long been known. Thus, to remove the volatile hydrocarbons, an inert gas stream, for example of carbon dioxide or nitrogen, can be used (cf. U.S. Pat No. 3,152,872, U.S. Pat. No. 4,258,158 U.S. Pat No. 4,372,758, U.S. Pat No. 4,372,758 and EP-Bl-0,127,253), the end product can be washed with a liquid olefin (cf. U.S. Pat No. 4,214,063) or devolatilization of the polyolefin powder with saturated aliphatic hydrocarbons can be carried out (cf. Chemical Abstracts 103 (1985), 54 599 r).

U.S. applications Ser. No. 07/257011 and Ser. No. 07/346896 now abandoned propose processes for removing suspending agents and unconverted monomers, in which the accompanying substances are removed in a devolatilization zone, which is also referred to as a drying zone, by passing in an inert gas stream, or flushing is carried out beforehand with ethylene followed by flushing with a mixture of nitrogen and steam.

It is an object of the present invention to provide a process for the preparation of ethylene polymers using a Ziegler catalyst system, preferably a vanadium-containing catalyst system, in which the resulting ethylene polymer has no odor.

We have found that this object is achieved by a process of the abovementioned type, wherein, according to the invention, the ethylene polymer is reacted, in a melting zone, preferably in an extruder, at from 170° to 280° C., with an additive, preferably in an amount of from 0.02 to 2% by weight, capable of binding acids by esterification, preferably with organic epoxide compounds.

Processes of the type stated at the outset are known and are carried out industrially, so that a more detailed description of these processes is unnecessary (cf. for example Ullmanns Encyklopädie der technischen Chemie, 4th edition, 1980, Volume 19, pages 178–186, or Encyclopedia of Polymer Science and Engineering, 2nd edition, 1986, Volume 6, pages 436–438). Ethylene polymers are understood here as meaning the homopolymers of ethylene and the copolymers of a predominant amount of ethylene with other α-olefins.

The substances to be used in the process are the conventional ones. This applies to the monomers, in particular ethylene, and to the comonomers, such as propylene, but-1-ene, hex-1-ene, 4-methylpent-1-ene or oct-1-ene, and to any low boiling hydrocarbons, preferably saturated $C_3$–$C_8$-hydrocarbons, present as suspending agents. The content of the comonomers which may be copolymerized in the ethylene polymer is preferably from 1 to 20% by weight. The catalyst systems used are also conventional ones and are of the Ziegler type, the vanadium-containing catalyst type which forms the subject of EP-A 166 888 being preferred. The same also applies to the inert gas used for subsequent flushing of the solid phase.

The mixture of solid ethylene polymer and unconverted gaseous monomers and any suspending agent is separated by continuously discharging the mixture into a let-down zone, which is in the form of a conventional let-down vessel and in which a pressure of from 0.1 to 3, in particular about 1.2, bar and a temperature of from 40° to 120° C. is maintained to allow the formation of a gaseous phase, which essentially consists of monomers and any suspending agent, and a solid phase, which essentially consists of an ethylene polymer and from 0.1 to 8% by weight, based on the weight of the polymer, of adhering monomers and any suspending agent. It is usual for the monomers separated off from the polymer to be recycled to the polymerization zone. In this context, reference may furthermore be made to the literature cited at the outset and in particular to EP-A-0 174 620.

In known processes, the solid ethylene polymer is discharged from the devolatilization zone and conveyed to a melting zone, which is usually in the form of an extruder.

The ethylene polymers obtained by the process stated at the outset preferably have densities of from 0.940 to 0.960 g/cm$^3$ and melt flow indices of from 1 to 300 g/10 min. The polymer grit, which still contains residual monomer and, where relevant, suspending agent, passes from the let-down zone into a devolatilization zone, also referred to as the drying zone, in which a pressure of from 1 to 1.2 bar is preferably maintained. In the devolatilization zone, a temperature of from 65° to 80° C. is usually maintained, and drying itself can be carried out in, for example, spiral dryers in a stream of inert gas. A particularly suitable inert gas is nitrogen or carbon dioxide (cf. U.S. application Ser. No. 07/257011).

In the novel process, the ethylene polymer should be reacted in the melt, preferably in an extruder, at from 170° to 280° C., with additives which are capable of binding acids by esterification, preferably with aliphatic epoxide compounds. The additives are preferably added in an amount of from 0.02 to 2% by weight, based on the amount of ethylene polymer. Examples of suitable organic epoxide compounds are epoxidized soybean oil, other epoxidized oils and fats and glycidyl compounds, such as glycidyl propionate. The additives can either be mixed with the polymer in a separate mixing zone, in which case the mixers known in industry can be used, or introduced into the melting zone of an extruder.

An advantage of the novel process is that the ethylene polymers obtained by the Ziegler polymerization process have an odor which is rated substantially better in a test based on DIN 10,955.

EXAMPLE (A) Copolymerization of ethene and but-1-ene

This was carried out continuously in a conventional loop reactor of the type described in U.S. Pat No. 3,242,150; the circular tube reactor had an inner circumference of 11.4 m and an internal diameter of 0.15 m.

The specific procedure during continuous steadystate operation was as follows:

(a) The reaction medium used was isobutane.
(b) The amount of monomeric ethylene in the reaction mixture was kept constant at 25% by volume.
(c) The amount of monomeric but-1-ene in the reaction mixture was kept constant at 4% by volume.
(d) The amount of hydrogen in the reaction mixture was kept constant at 0.15% by volume.
(e) A Ziegler catalyst system which forms the subject of EP-A 166,888, ie. consisting of
   (1) a transition metal catalyst component as described at the end of this Example,
   (2) aluminumtriisobutyl and
   (3) trichloromonofluoromethane, was used, with the provisos that the atomic ratio of transition metal from the catalyst component (1) to aluminum from the catalyst component (2) was 1 : 5.63 and the molar ratio of catalyst component (2) to catalyst component (3) was 1:0.11, each of these ratios being kept constant.
   The reference parameter for the absolute amounts of these catalyst components was a concentration of the aluminumtriisobutyl in the reaction mixture of 135 mg/kg of isobutane, the said concentration being kept constant.
(f) Copolymerization was carried out at 80° C., corresponding to a total pressure of the reaction mixture of about 40 bar.
(g) The reaction mixture was circulated at a rate of 8 m/s.
(h) The mean concentration $C_m$ of polymer in the circulation was kept constant at 0.54 g of polymer per g of reaction mixture.
(i) The polymer formed was removed from the reactor by discharging the reaction mixture in the middle of the lowermost section of the loop, at its uppermost inner side; here, the concentration of polymer was 0 59 $C_m$, corresponding to 0.32 g of polymer per g of reaction mixture.

19.5 kg of copolymer per hour were obtained in this manner; the copolymer had a melt flow index (according to DIN 53,735 at 190° C./21.6 kg) of 165 g/10 min, a density (according to DIN 53,479) of 0.949 g/cm$^3$, a mean particle diameter (according to DIN 53,477) of 0.95 mm and a bulk density (according to DIN 53,468) of 495 g/cm$^3$.

(B) Preparation of the transition metal catalyst component (1) used for the polymerization described above Stage (1.1)

25 parts by weight of silica (SiO$_2$, particle diameter 20–60 μm, pore volume 1.75 cm$^3$/g, specific surface area: 340 m$^2$/g) and a solution of 100 parts by weight of tetrahydrofuran and 12.5 parts by weight of a transition metal composition consisting of 100 molar parts of a vanadium trihalide/alcohol complex of the formula VCl$_3$ 4 ZOH, where Z is isopropyl, 1.3 molar parts of titanium trihalide of the formula TiCl$_3$ 1/3 AlCl and 6.7 molar parts of zirconium tetrachloride were used as starting materials. These two components were combined, and the resulting suspension was stirred for a short time. Thereafter, the resulting solid-phase intermediate was isolated by expelling the volatile constituents in a rotary evaporator, which was brought to an operating pressure of 10 mbar and an operating temperature of 70° C.

Stage (1.2)

20 parts by weight of the solid-phase intermediate obtained in Stage (1.1) were suspended in 160 parts by weight of n-heptane, after which a solution of 8 parts by weight of diethylaluminum chloride in 20 parts by weight of n-heptane was added to this suspension, and the resulting suspension was stirred for a short time at 65° C. It was then filtered, and the residue was washed three times with n-heptane and dried under reduced pressure. Analysis of the resulting solid-phase product, ie. catalyst component (1), gave a transition metal content of 0.00156 mol/g.

(C) Reaction of the resulting copolymer with an epoxide compound

The copolymer obtained under (A) was freed from the major part of the suspending agent and of the volatile starting materials by reducing the pressure to 1 bar. Furthermore, residues of volatile constituents were removed by flushing with a stream of nitrogen. The finely divided copolymer thus obtained was mixed, in a mixing vessel, with 2,000 ppm of Ca stearate, 1,000 ppm of Irganox ® 1076 (a sterically hindered phenolic antioxidant from Ciba Geigy) and 200 ppm of Edenol ® D 81 (an epoxidized soybean oil from Henkel), melted in a single-screw extruder (diameter 20 mm, length 20 D, discharge rate 1 kg/h) and processed to granules.

COMPARATIVE EXAMPLE

The procedure described in the Example according to the invention was followed, except that the epoxidized soybean oil under (C) was not used.

The product obtained in the Example according to the invention gave an odor rating 1.5 units better than the product of the Comparative Example in an odor test based on DIN 10,955.

We claim:

1. A process for the preparation of an ethylene polymer by polymerizing the monomers in a polymerization zone under from 5 to 60 bar and at not more than 120° C. in a stirred or fluidized dry phase or in a lower boiling hydrocarbon as a suspending agent in the presence of a Ziegler catalyst system, isolating the resulting solid ethylene polymer from unconverted monomers after reducing the pressure in a let-down zone, removing the residual amounts of monomers in a devolatilization zone by passing in an inert gas stream and transferring the solid ethylene polymer to a melting zone in an extruder, wherein the ethylene polymer is reacted, in the extruder, with an additive capable of binding acids by esterification.

2. A process as defined in claim 1, wherein the resulting solid ethylene polymer is isolated from suspending agent after reducing the pressure in a letdown zone.

3. A process as defined in claim 1, wherein the residual amounts of suspending agent are removed in a devolatilization zone by passing in an inert gas stream.

4. A process as defined in claim 1, wherein the ethylene polymer is mixed with, and reacted with, the additive in the extruder at from 180° to 280° C.

5. A process as defined in claim 1, wherein the molten ethylene polymer is reacted with from 0.02 to 2% by weight of the additive.

6. A process as defined in claim 1, wherein the ester-forming additive consists of an organic epoxide compound.

7. A process as defined in claim 1, wherein the Ziegler catalyst system consists of a vanadium catalyst component, an organoaluminum catalyst component and an organohalogen catalyst component.

8. A process as defined in claim 1, wherein the additive capable of binding acids by esterification is an aliphthatic epoxide compound.

* * * * *

UNITED STATES PATENT AND TRADEMARK OFFICE
CERTIFICATE OF CORRECTION

PATENT NO. : 5,039,765

DATED : August 13, 1991

INVENTOR(S) : Roland SAIVE et al.

It is certified that error appears in the above-identified patent and that said Letters Patent is hereby corrected as shown below:

Claim 8, Column 6, Line 5:

That part reading "aliphthatic" should read --aliphatic--

Signed and Sealed this

Ninth Day of February, 1993

Attest:

STEPHEN G. KUNIN

Attesting Officer

Acting Commissioner of Patents and Trademarks